US012647053B2

(12) United States Patent
Lee

(10) Patent No.: US 12,647,053 B2
(45) Date of Patent: Jun. 2, 2026

(54) BRAKE SYSTEM AND METHOD FOR COMPENSATING FOR POSITION DATA ERROR OF MOTOR OF THE SAME

(71) Applicant: HL MANDO CORPORATION, Pyeongtaek-si (KR)

(72) Inventor: Hanjun Lee, Pyeongtaek-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 80 days.

(21) Appl. No.: 18/902,647

(22) Filed: Sep. 30, 2024

(65) Prior Publication Data

US 2025/0141373 A1 May 1, 2025

(30) Foreign Application Priority Data

Oct. 31, 2023 (KR) ........................ 10-2023-0147625
Aug. 1, 2024 (KR) ........................ 10-2024-0102757

(51) Int. Cl.
*H02P 6/16* (2016.01)
*B60T 13/74* (2006.01)
*B60T 17/22* (2006.01)

(52) U.S. Cl.
CPC .............. *H02P 6/16* (2013.01); *B60T 13/741* (2013.01); *B60T 17/221* (2013.01); *B60T 2270/406* (2013.01)

(58) Field of Classification Search
CPC ........ H02P 6/16; B60T 13/741; B60T 17/221; B60T 2270/406; B60T 17/22
See application file for complete search history.

(56) References Cited

U.S. PATENT DOCUMENTS 7,365,503 B2 * 4/2008 Rutkowski ................ H02P 6/16
318/700

FOREIGN PATENT DOCUMENTS

JP 2022126289 A 8/2022
KR 10-1831132 B1 2/2018

OTHER PUBLICATIONS

Lee et al., "Study on error Compensation of Motor Rotor Position Sensor in the Worst Case 1 Conditions," Korean Society of Automotive Engineers Autumn Conference, Ulsan, South Korea, Nov. 15-18, 2023, pp. 1-5. (5 pages).

* cited by examiner

*Primary Examiner* — Xiao En Mo
(74) *Attorney, Agent, or Firm* — Seed Intellectual Property Law Group LLP

(57) ABSTRACT

A brake system includes a motor which drives an electro mechanical brake, a motor position sensor which generates and outputs a rotor position signal of the motor, and a controller which is electrically connected to the motor and the motor position sensor, and the controller monitors a current or a voltage of at least one phase of three phases of the motor while controlling the motor to fixedly drive any one phase of three phases of the motor, determines an ambient temperature of the motor by monitoring a current or a voltage of at least one phase, and compensates for an electric angle of the motor obtained by an output signal of the motor position sensor based on the determined ambient temperature.

20 Claims, 12 Drawing Sheets

(a)

(b)

<u>1</u>

(a)               (b)

(a)

(b)

(c)

501

CONTROL MOTOR TO FIXEDLY DRIVE
ANY ONE PHASE AMONG THREE PHASES OF MOTOR

503

MONITOR CURRENT AND/OR VOLTAGE OF AT LEAST
ONE PHASE AMONG THREE PHASES OF MOTOR

505

DETERMINE AMBIENT TEMPERATURE OF MOTOR
BY MONITORING CURRENT
AND/OR VOLTAGE OF AT LEAST ONE PHASE

507

COMPENSATE FOR ELECTRIC ANGLE OF MOTOR
BASED ON AMBIENT TEMPERATURE OF MOTOR

1

BRAKE SYSTEM AND METHOD FOR COMPENSATING FOR POSITION DATA ERROR OF MOTOR OF THE SAME

CROSS-REFERENCE TO RELATED APPLICATIONS

This application claims the priority of Korean Patent Application Nos. 10-2023-0147625 and 10-2024-0102757 filed on Oct. 31, 2023, and Aug. 1, 2024, respectively, in the Korean Intellectual Property Office, the disclosure of which is incorporated herein by reference.

BACKGROUND

Technical Field

The present disclosure relates to a brake system and a method for compensating for a position data error of a motor of the same.

Description of Related Art

As electric vehicles become more widespread and electrified, internal combustion engines and brake systems of vehicles are changing from mechanical type to electronic type. In accordance with this change, application of three-phase motors as actuators of the brake systems is increasing and motor state diagnosis (for example, failure diagnosis) is also becoming important.

In order to control a motor and diagnose a state, a controller of a brake system may basically acquire a phase current and a location signal of a rotor.

For example, the controller may diagnose the state of the motor by determining whether a ratio of current which flows through windings is normal by monitoring the phase current.

Further, the position signal of the rotor may be acquired based on an output value of a motor position sensor (MPS) so that it is requested to accurately identify an alignment degree of a motor position sensor and a magnet attached to the rotor to diagnose the state of the motor.

The controller may identify the alignment degree of the motor position sensor and the magnet attached to the rotor based on the position information of the rotor. However, the motor position sensor has a sensor unit error and an assembly tolerance so that there is a problem in that it is difficult to identify an alignment degree of the motor position sensor, that is, to set accurate diagnosis criteria during the state diagnosis. Accordingly, when the motor is driven under the room temperature condition, it may be ideal to perform a calibration task to record an output value of the motor position sensor and/or electrical angle information (also called a counter electromotive force signal) obtained based on the output value of the motor position sensor in a memory and define the corresponding value as a reference.

However, in the case of the actual vehicle, due to various vibrations of the vehicle, tilt may occur between the rotor of the motor and the motor position sensor. Further, the electrical angle obtained by the controller under the harsh environment exceeds an allowable error range so that the controller may detect that the motor position sensor is underperforming or faulty.

Accordingly, a technology for an accurate state diagnosis of the motor position sensor is requested.

BRIEF SUMMARY

An aspect of the present disclosure is to provide a brake system and a method for compensating for a position data error of a motor thereof which compensate a position data error (for example, an electric angle) due to influence of an ambient temperature to minimize the diagnosis as a failure state when the state of the motor is diagnosed.

According to an aspect of the present disclosure, a brake system includes a motor configured to drive an electro mechanical brake, a motor position sensor configured to generate and output a rotor position signal of the motor, and a controller electrically connected to the motor and the motor position sensor, and the controller may monitor a current or a voltage of at least one phase of three phases of the motor while controlling the motor to fixedly drive any one phase of three phases of the motor, determine an ambient temperature of the motor by identifying a maximum current and a minimum current of the at least one phase or identifying a maximum voltage and a minimum voltage of the at least one phase, and compensate for an electric angle of the motor acquired by an output signal of the motor position sensor based on the determined ambient temperature.

The at least one phase may include at least one, among phases other than a fixedly driven phase, among three phases of the motor.

The controller may determine the ambient temperature of the motor, further based on a reference current value at every temperature which is previously stored for each phase of the motor and the reference current value at every temperature which is previously stored includes a reference maximum current and a reference minimum current at every temperature which are previously stored for each phase of the motor or a difference of the reference maximum current and the reference minimum current at every temperature which are previously stored for each phase of the motor.

The controller may determine a temperature of a reference current value matching the maximum current and the minimum current of the at least one phase, in the reference current value at every temperature which is previously stored, as an ambient temperature of the motor.

The controller may determine the ambient temperature of the motor, further based on a reference voltage value at every temperature which is previously stored for each phase of the motor, and the reference voltage value at every temperature which is previously stored may include a reference maximum voltage and a reference minimum voltage at every temperature which are previously stored for each phase of the motor or a difference of the reference maximum voltage and the reference minimum voltage at every temperature which are previously stored for each phase of the motor.

The controller may determine a temperature of a reference voltage value matching the maximum voltage and the minimum voltage of the at least one phase, in the reference voltage value at every temperature which is previously stored, as an ambient temperature of the motor.

The controller may compensate for the electric angle of the motor, further based on a compensated electric angle at every temperature which is previously stored.

The controller may determine whether the motor is in a failure state or a normal state based on the electric angle of the motor and a previously stored reference electric angle.

The controller may, when the motor is in a failure state, compensate for the electric angle of the motor.

The controller may control the motor by fixedly driving any one phase by applying a power for initial diagnosis of the motor.

According to an aspect of the present disclosure, a position data error compensating method of a motor of a brake system may include monitoring a current or a voltage of at least one phase of three phases of a motor which drives an electro mechanical brake while controlling the motor to fixedly drive any one phase of three phases of the motor, determining an ambient temperature of the motor by identifying a maximum current and a minimum current of the at least one phase or identifying a maximum voltage and a minimum voltage of the at least one phase, according to the monitoring of the current or the voltage of the at least one phase, and compensating for an electric angle of the motor acquired by an output signal of the motor position sensor based on the determined ambient temperature.

At least one phase may include at least one, among phases other than a fixedly driven phase, among three phases of the motor.

The determining of the ambient temperature of the motor may be further based on a reference current value at every temperature which is previously stored for each phase of the motor and the reference current value at every temperature which is previously stored may includes a reference maximum current and a reference minimum current at every temperature which are previously stored for each phase of the motor or a difference of the reference maximum current and the reference minimum current at every temperature which are previously stored for each phase of the motor.

The determining of an ambient temperature of the motor may include determining a temperature of a reference current value matching the maximum current and the minimum current of the at least one phase, in the reference current value at every temperature which is previously stored, as the ambient temperature of the motor.

The determining of the ambient temperature of the motor may be further based on a reference voltage value at every temperature which is previously stored for each phase of the motor and the reference voltage value at every temperature which is previously stored may include a reference maximum voltage and a reference minimum voltage at every temperature which are previously stored for each phase of the motor or a difference of the reference maximum voltage and the reference minimum voltage at every temperature which are previously stored for each phase of the motor.

The determining of the ambient temperature of the motor may include determining a temperature of a reference voltage value matching the maximum voltage and the minimum voltage of the at least one phase, in the reference voltage value at every temperature which is previously stored, as the ambient temperature of the motor.

The compensating of the electric angle of the motor may further be based on a compensated electric angle at every temperature which is previously stored.

The compensating of the electric angle may include determining whether the motor is in a failure state or a normal state based on the electric angle of the motor and a previously stored reference electric angle.

The compensating of the electric angle may include compensating for the electric angle of the motor when the motor is in the failure state.

The controlling of the motor to fixedly drive any one phase may be based on the power application for initial diagnosis of the motor.

The effects of the present disclosure are not limited to the aforementioned effects, and other effects, which are not mentioned above, will be apparently understood to a person having ordinary skill in the art from the following description.

The objects to be achieved by the present disclosure, the means for achieving the objects, and the effects of the present disclosure described above do not specify essential features of the claims, and, thus, the scope of the claims is not limited to the disclosure of the present disclosure.

BRIEF DESCRIPTION OF THE SEVERAL VIEWS OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
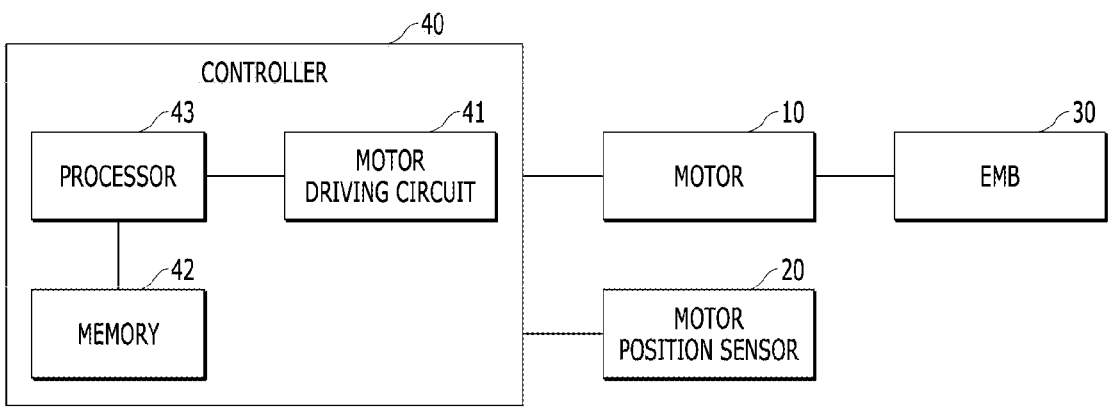
FIG. 1 is a view illustrating some configurations of a vehicle brake system according to an exemplary embodiment.

Like reference numerals refer to like components throughout the specification. This specification does not describe all the components of the embodiments, and duplicative contents between embodiments or general contents in the technical field of the present disclosure will be omitted. The terms 'part,' 'module,' 'member,' and 'block' used in this specification may be embodied as software or hardware, and it is also possible for a plurality of 'parts,' 'modules,' 'members,' and 'blocks' to be embodied as one component, or one 'part,' 'module,' 'member,' and 'block' to include a plurality of components according to embodiments.

Throughout the specification, when a part is referred to as being 'connected' to another part, it includes not only a direct connection but also an indirect connection, and the indirect connection includes connecting through a wireless network.

Also, when it is described that a part 'includes' a component, it means that the part may further include other components, not excluding the other components unless specifically stated otherwise.

Throughout the specification, when a member is described as being 'on' another member, this includes not only a case in which the member is in contact with the other member but also a case in which another member is present between the two members.

The terms first, second, etc. are used to distinguish one component from another component, and the components are not limited by the above-mentioned terms.

The singular forms 'a,' 'an,' and 'the' include plural referents unless the context clearly dictates otherwise.

In each operation, an identification numeral is used for convenience of explanation, the identification numeral does not describe the order of the operations, and each operation may be performed differently from the order specified unless the context clearly states a particular order.

In the initial stage after mass production of a brake system, the alignment between a rotor of a motor for driving a brake system and a motor position sensor of the motor is in a straight line. However, when the brake system is mounted on the vehicle to operate, tilt may occur between the motor and the motor position sensor due to various reasons, such as loosening of the fastened parts due to vibration and/or deformation of a rotor shaft of the motor due to heat. The tilt caused between the motor and the motor position sensor leads to an increased error of position data, more specifically, an electric angle of the motor obtained by an output signal of the motor position sensor.

The increased error of the electric angle may cause the motor to be determined as a failure state during the motor state diagnosis, which may forcibly stop the motor according to a predetermined logic.

In the meantime, the increased error of the electric angle of the motor may be affected by the ambient temperature. To be more specific, a magnetic field of the motor may be deteriorated under a high temperature condition so that the electric angle error generated in the motor may be larger under the high temperature condition than under the room temperature condition.

The present disclosure is provided to propose a technology for reducing a situation in which the motor is determined as a failure state by compensating position data of the motor to minimize the influence of the ambient temperature on the motor during the motor state diagnosis.

For example, according to the present disclosure, a current noise value is acquired by monitoring each-phase current generated during the motor operation and the ambient temperature may be estimated based on the current noise value. According to the present disclosure, a characteristic that an amplitude of the current noise increases under a high temperature condition is utilized to compare an amplitude of a current noise under the high temperature condition with an amplitude of a current noise under the room temperature condition to estimate an ambient temperature as much as an increased value.

Further, according to the present disclosure, the electric angle of the motor is compensated based on the estimation of the ambient temperature so that a situation in which the motor is determined as a failure state may be minimized.

Hereinafter, operating principles and exemplary embodiments of the present disclosure will be described with reference to the accompanying drawings.

Figure 2:
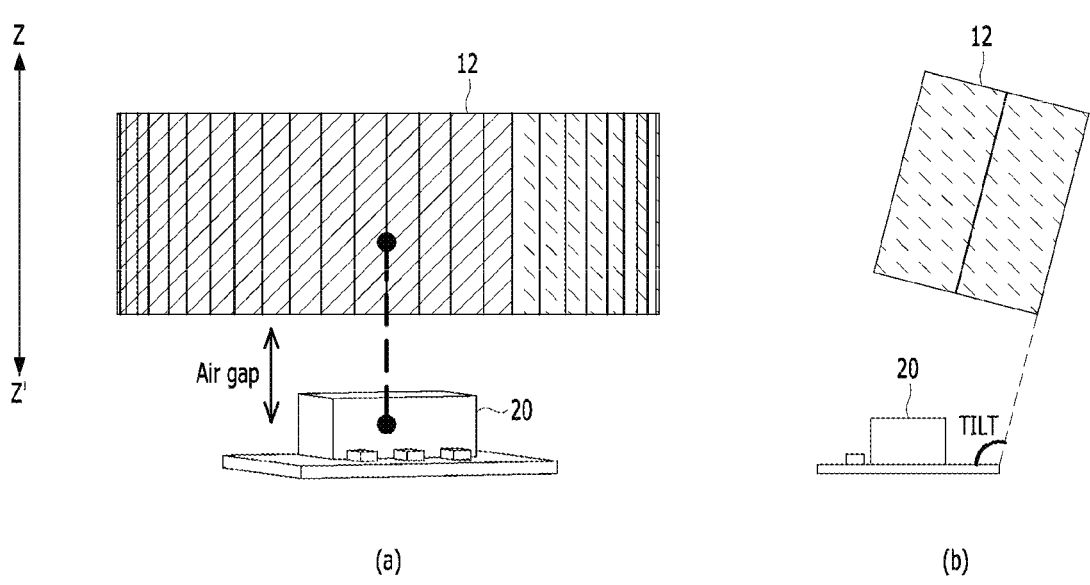
FIG. 2 is a view illustrating a normal placement state and a tilted placement state of a motor and a motor position sensor of a brake system according to an exemplary embodiment.
Figure 3:
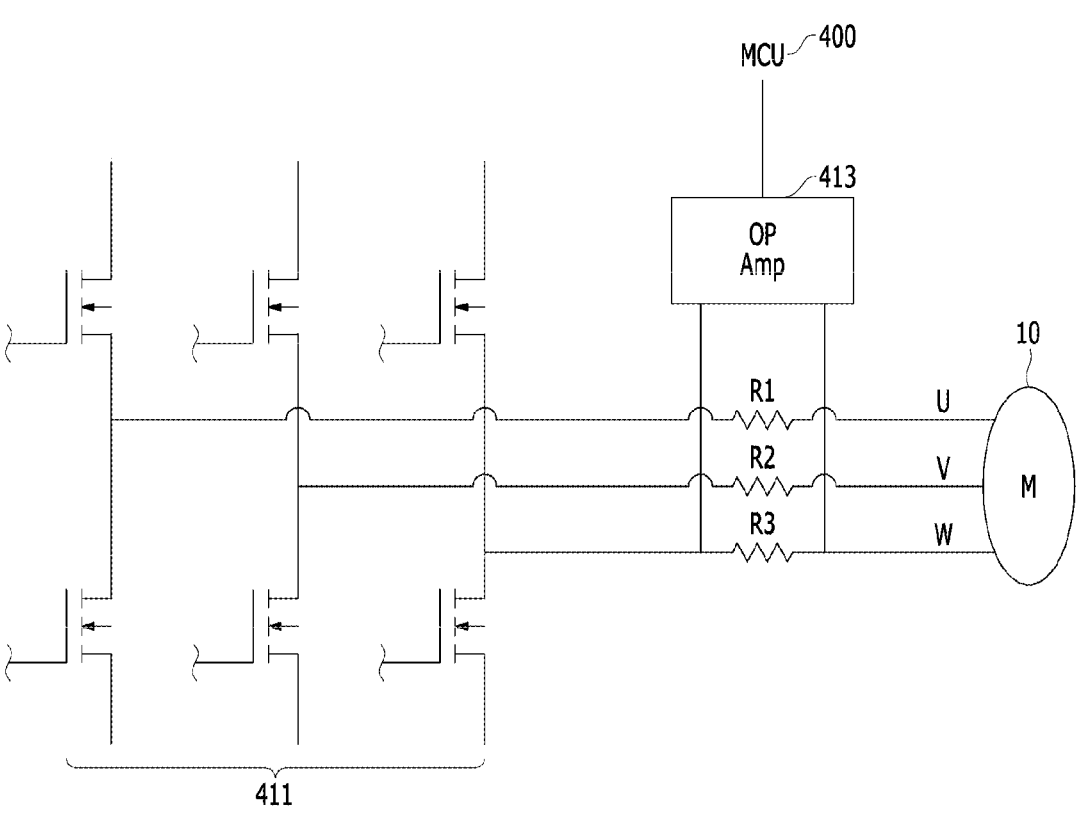
FIG. 3 is a view illustrating a part of a motor driving circuit according to an exemplary embodiment.
Figure 4:
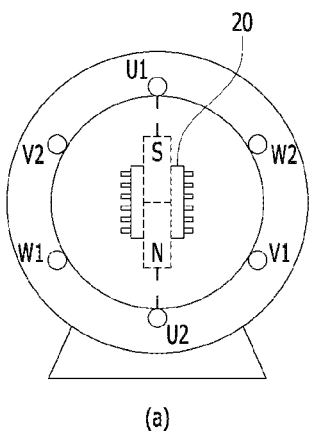
FIG. 4 is a view for explaining fixed driving control of each phase of a motor according to an exemplary embodiment.
Figure 4:
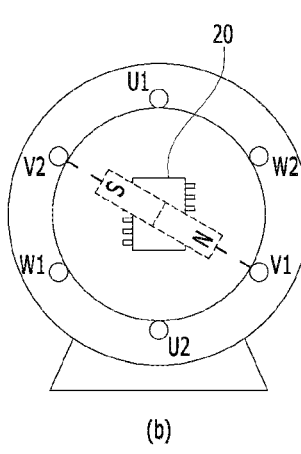
Figure 4:
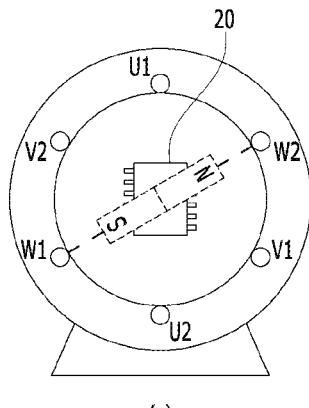

FIG. 1 is a view illustrating some configurations of a vehicle brake system according to an exemplary embodiment. FIG. 2 is a view illustrating a normal placement state and a tilted placement state of a motor and a motor position sensor of a brake system according to an exemplary embodiment. FIG. 3 is a view illustrating a part of a motor driving circuit according to an exemplary embodiment. FIG. 4 is a view for explaining fixed driving control of each phase of a motor according to an exemplary embodiment.

Referring to FIG. 1, a vehicle brake system 1 may include a controller 40, a motor 10, a motor position sensor 20, and/or an electro mechanical brake (EMB) 30.

The motor 10 receives a driving current from a motor driving circuit 41 of the controller 40 to generate a torque.

For example, the motor 10 may be a three-phase (U, V, W) motor (for example, a three-phase blushless DC (BLDC) motor, a brushless alternating current motor (BLAC) or a permanent magnet synchronous motor (PMSM)).

The motor position sensor 20 may generate position data of the motor 10.

The motor position sensor 20 may include a hall sensor.

For example, the motor position sensor 20 may be a dual-die type sensor.

For example, the position data may include an electric angle of the motor 10.

The motor position sensor 20 may generate and output a position signal of a rotor of the motor 10 and the controller 40 may calculate an electric angle of the motor 10 based on the position signal of the rotor.

Referring to FIG. 2A, the motor position sensor 20 is spaced apart from the rotor 12 of the motor 10 with a predetermined air gap therebetween to be disposed on the same axis (Z-Z'). Therefore, the motor position sensor 20 may accurately sense a rotation speed and a position of the rotor 12.

In the meantime, when the brake system 1 is driven, due to various reasons, the axis of the rotor 12 of the motor 10 is deformed, as illustrated in FIG. 2B, and tilt occurs between the motor position sensor 20 and the motor 10 so that the controller 40 described below may determine that the motor 10 is in a failure state.

The electro mechanical brake 30 may be a caliper brake.

Even though it is not illustrated in the drawings, in every wheel, the electro mechanical brake 30 may include a disk (not illustrated) which rotates together with a wheel, a brake pad (not illustrated) which is installed to pressurize the disk, and a caliper housing (not illustrated) which operates the brake pad, and a piston (not illustrated) which is installed in the caliper housing to move forward and backward, and a power conversion unit (not illustrated) which receives a rotation driving force generated by the motor 10 to be converted into a linear driving force and transmit the linear driving force to the piston to move the piston.

The controller 40 may perform the overall control of the vehicle brake system 1.

The controller 40 is electrically connected to the motor 10 and/or the motor position sensor 20 to control the motor 10 and/or the motor position sensor 20.

The controller 40 may include a motor driving circuit 41, a memory 42, and/or a processor 43.

The motor driving circuit 41 may control a driving current which is supplied to the motor 10 according to a motor (10) control signal of the processor 43.

For example, the motor driving circuit 41 may include a three-phase inverter including a plurality of switching elements which controls a driving current which is supplied to the motor 10.

Referring to FIG. 3, the motor driving circuit 41 may include a plurality of switching elements 411 and an operational amplifier (OP AMP) 413. Further, the motor driving circuit 41 may include a resistor (for example, a shunt resistor (very small value)) connected to each phase U, V, W of the motor 10.

Further, the motor driving circuit 41 may include an inverter driver which controls the switching elements included in the three-phase inverter according to a motor control signal of a micro controller unit (MCU) 400 included in the controller 40. The three-phase inverter may convert a DC power supplied from a battery of the vehicle into an AC power according to the motor (10) driving signal of the inverter driver and supply the converted AC power to the motor 10.

The memory 42 may store or memorize a program and data to implement an operation of controlling configurations included in the controller 40, that is, to implement an operation of controlling the controller 40.

The memory 42 provides the stored program and data to the processor 43 and stores temporary data which is generated during the operation of the processor 43.

For example, the memory 42 may include a volatile memory such as a static random access memory (S-RAM) or a dynamic random access memory (D-RAM) and a non-volatile memory such as a read only memory (ROM), an erasable programmable read only memory (EPROM), or a flash memory.

The processor 43 may provide a control signal for controlling operations of configurations included in the brake system 1.

The processor 43 may control the motor driving circuit 41.

For example, the processor 43 may control the motor driving circuit 41 to verify an initial state of the motor 10.

Further, the processor 43 may control the motor driving circuit 41 to drive the motor 10 for brake control by means of the electro mechanical brake 30.

The processor 43 may diagnose the state of the motor 10 based on the control of the motor driving circuit 41 and for example, determine the motor 10 to be a failure state or a normal state.

For example, the processor 43 may diagnose the state of the motor based on power application to the processor 43 for initial diagnosis and/or based on the driving of the brake system 1 for vehicle brake control.

The processor 43 may determine whether the motor 10 is in a failure state or a normal state by monitoring an output signal of the motor position sensor 20 and/or a current flowing through the motor 10.

The processor 43 may acquire a reference electric angle of the motor 10 by means of an output signal of the motor position sensor 20 during alignment driving control for each phase U, V, W of the motor 10 and store the acquired reference electric angle in the memory 42. For example, the alignment driving control for each phase U, V, W of the motor 10 may be performed under a predetermined environment condition (for example, a temperature condition).

In the memory 42, a reference electric angle for every phase which is fixedly driven may be stored as represented in the following Table 1.

TABLE 1

| Fixedly driven phase | Reference electric angle |
|---|---|
| U | First reference electric angle |
| V | Second reference electric angle |
| W | Third reference electric angle |

In order to diagnose the state of the motor 10, the processor 43 may acquire an electric angle of the motor 10 by means of the output signal of the motor position sensor 20 while controlling any one phase of three phases U, V, W of the motor 10 to be fixedly driven. The processor 43 may diagnose the state of the motor 10 by comparing a reference electric angle stored in the memory 42 and the acquired electric angle.

The fixed driving control of any one phase of three phases of the motor will be described with fixed driving control of the V-phase as an example. A current with a predetermined fixed magnitude is applied to a V-phase coil to form a fixed magnetic field around the V-phase coil and a magnitude and a direction of current applied to the U-phase and the W-phase are controlled according to a predetermined logic to control the rotor 12 of the motor 10 to be fixed to a specific position with respect to the magnetic field of the V-phase.

Referring to FIG. 4, when the U-phase, among three phases U, V, W of the motor 10, is controlled to be fixedly driven, a fixed magnetic field is formed in the U-phase coil and the magnetic field forms an N pole and a S pole on both ends of the U-phase coil, as illustrated in FIG. 4A. As the N pole and the S pole are formed on both ends of the U-phase coil, the rotor 12 of the motor 10 is fixed to a corresponding position.

Further, when the V-phase, among three phases U, V, W of the motor 10 is controlled to be fixedly driven, a fixed magnetic field is formed in the V-phase coil and the magnetic field forms an N pole and an S pole on both ends of the V-phase coil, as illustrated in FIG. 4B. As the N pole and the S pole are formed on both ends of the V-phase coil, the rotor 12 of the motor 10 is fixed to a corresponding position.

Further, when the W-phase, among three phases U, V, W of the motor 10 is controlled to be fixedly driven, a fixed magnetic field is formed in the W-phase coil and the magnetic field forms an N pole and a S pole on both ends of the W-phase coil, as illustrated in FIG. 4C. As the N pole and the S pole are formed on both ends of the W-phase coil, the rotor 12 of the motor 10 is fixed to a corresponding position.

For example, when the processor 43 acquires an electric angle of 47 degrees by means of an output signal of the motor position sensor 20 while controlling the U-phase of the motor 10 to be fixedly driven and the reference electric angle of the fixedly driven U-phase is 45 degrees, the processor 43 may identify that an error of +2 degrees is generated.

When the processor 43 acquires an electric angle of 168 degrees by means of an output signal of the motor position sensor 20 while controlling the V-phase of the motor 10 to be fixedly driven and the reference electric angle of the fixedly driven V-phase is 165 degrees, the processor 43 may identify that an error of +3 degrees is generated.

When the processor 43 acquires an electric angle of 285 degrees by means of an output signal of the motor position sensor 20 while controlling the W-phase of the motor 10 to be fixedly driven and the reference electric angle of the fixedly driven W-phase is 283 degrees, the processor 43 may identify that an error of +2 degrees is generated.

If at least one of an error identified by controlling the U-phase to be fixedly driven, an error identified by controlling the V-phase to be fixedly driven, and an error identified by controlling the W-phase to be fixedly driven is higher than a predetermined reference error, the processor 43 determines that the motor 10 is in a failure state and otherwise may determine that the motor 10 is in a normal state.

The processor 43 may compensate for the electric angle of the motor 10 based on the determination that the motor 10 is in the failure state.

For example, the processor 43 may determine an ambient temperature of the motor 10 by monitoring a phase current and/or phase voltage of the motor 10 based on the determination that the motor 10 is in the failure state.

The processor 43 monitors a phase current of the motor 10 while fixedly driving any one phase of three phases U, V, and W of the motor 10 to identify a maximum current value and a minimum current value of at least one phase which is not fixedly driven and/or calculate a difference of the maximum current value and the minimum current value of at least one phase which is not fixedly driven.

The processor 43 monitors a phase voltage of the motor 10 while fixedly driving any one phase of three phases U, V, and W of the motor 10 to identify a maximum voltage value and a minimum voltage value of at least one phase which is not fixedly driven and/or calculate a difference of the maximum voltage value and the minimum voltage value of at least one phase which is not fixedly driven.

Referring to FIG. 3, shunt resistors R1, R2, and R3 are connected to the phases U, V, and W. That is, R1 is connected to the U-phase, R2 is connected to the V-phase, and R3 is connected to the W-phase so that when a current I flows, a voltage corresponding to a value (I×R) obtained by multiplying current and the resistance is input to the OP Amp 413. The OP Amp 413 amplifies the voltage by a predetermined gain value to transmit the amplified voltage to the MCU 400.

The MCU 400 is applied with a voltage corresponding to a current value of each phase of the motor 10 in real time and may identify a maximum current value and a minimum current value of each phase and/or a maximum voltage value and a minimum voltage value. Further, the MCU 400 may calculate a difference of the maximum current value and the minimum current value of each phase of the motor 10 and/or a difference of the maximum voltage value and the minimum voltage value of each phase.

The processor 43 may determine an ambient temperature of the motor 10 based on a reference current value and/or a reference voltage value at every temperature for each phase of the motor 10 which is stored in the memory 42.

For example, the reference current value at every temperature for each phase of the motor 10 which is stored in the memory 42 may include a reference maximum current and a reference minimum current at every temperature which are previously stored for each phase of the motor or a difference of the reference maximum current and the reference minimum current at every temperature which are previously stored for each phase of the motor.

The reference voltage value at every temperature for each phase of the motor 10 which is stored in the memory 42 may include a reference maximum voltage and a reference minimum voltage at every temperature which are previously stored for each phase of the motor or a difference of the reference maximum voltage and the reference minimum voltage at every temperature which are previously stored for each phase of the motor.

The processor 43 may compensate for an electric angle of the motor 10 based on the determined ambient temperature.

For example, the processor 43 may compensate for the electric angle of the motor 10 based on a previously stored compensated electric angle at every temperature.

Figure 5:
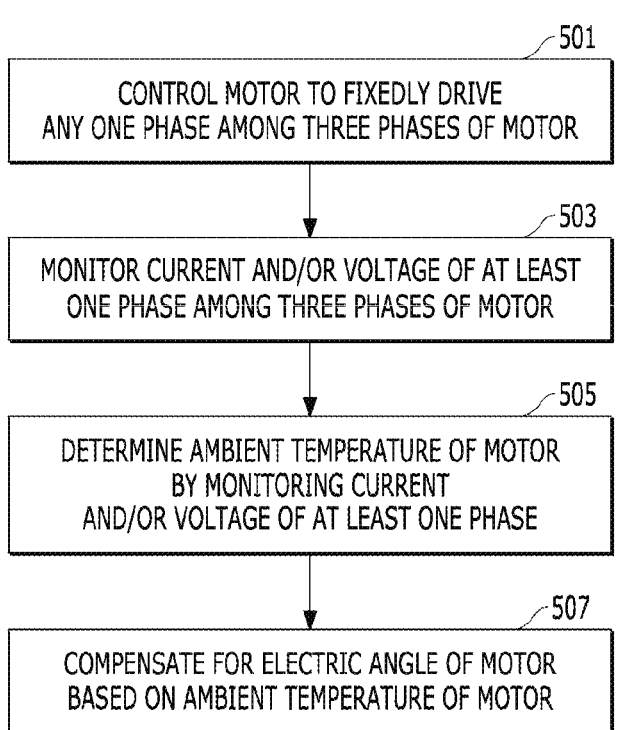
FIG. 5 is a flowchart of an operation of a brake system according to an exemplary embodiment.

FIG. 5 is a flowchart of an operation of a brake system 1 (and/or a controller 40) according to an exemplary embodiment.

Referring to FIG. 5, the brake system 1 may control the motor 10 to fixedly drive any one phase of three phases U, V, and W of the motor 10 (501).

The brake system 1 may control the motor 10 to fixedly drive any one phase by applying a power to the brake system 1 for initial diagnosis of the motor 10.

For example, any one phase may be designated in advance or randomly determined.

The brake system 1 may monitor a current and/or a voltage of at least one phase of three phases of the motor 10 while controlling the motor 10 to fixedly drive any one phase (503).

The brake system 1 may acquire an electric angle of the motor 10 by means of the output signal of the motor position sensor 20 while controlling the motor 10 to fixedly drive any one phase of the motor 10 and may determine whether the motor 10 is in a failure state or a normal state based on the acquired electric angle.

For example, the brake system 1 may determine whether the motor 10 is in a failure state or a normal state by comparing a previously stored reference electric angle and the acquired electric angle. When an error between the previously stored reference electric angle and the acquired electric angle exceeds a predetermined reference, the brake system 1 may determine that the motor 10 is in a failure state.

When the motor 10 is in a failure state, the brake system 1 may identify a maximum current and a minimum current of at least one phase acquired by monitoring a current of at least one phase.

When the motor 10 is in a failure state, the brake system 1 may identify a maximum voltage and a minimum voltage of at least one phase acquired by monitoring a voltage of at least one phase.

The brake system 1 may determine an ambient temperature of the motor 10 by monitoring at least one phase (505).

The brake system 1 may determine an ambient temperature of the motor 10 based on a maximum current and a minimum current of at least one phase acquired by monitoring a current of at least one phase.

The brake system 1 may determine an ambient temperature of the motor 10 based on a maximum voltage and a minimum voltage of at least one phase acquired by monitoring a voltage of at least one phase.

The brake system 1 may identify a temperature of a reference value which matches the maximum current and the minimum current of at least one phase acquired by monitoring a current of at least one phase, at a previously stored reference value at every temperature, and determine the identified temperature as the ambient temperature of the motor 10.

The brake system 1 may identify a temperature of a reference value which matches the maximum voltage and the minimum voltage of at least one phase acquired by monitoring a voltage of at least one phase, at a previously stored reference value at every temperature, and determine the identified temperature as the ambient temperature of the motor 10.

The brake system 1 may compensate for an electric angle of the motor 10 based on the ambient temperature of the motor 10 (507).

The brake system 1 may identify a compensated electric angle of a temperature which matches an ambient temperature of the motor 10 at a previously stored compensated electric angle at every temperature and apply the identified compensated electric angle as a compensated angle of an electric angle of the motor 10 to compensate an electric angle of the motor 10.

The above-described exemplary embodiments of the present disclosure were derived by the following research and the research processes and results will be described with reference to FIGS. 6 to 12.

Generally, a sum of line-to-line currents of the three-phase motor should be 0 [A] and in order to inspect a state of a single motor unit, it is necessary to confirm whether the line-to-line currents are the same.

A state of the motor may be indirectly diagnosed by inspecting that the currents of the phases are measured at the ratio of 2:1:1 by fixedly driving any one phase of three phases.

Figure 6:
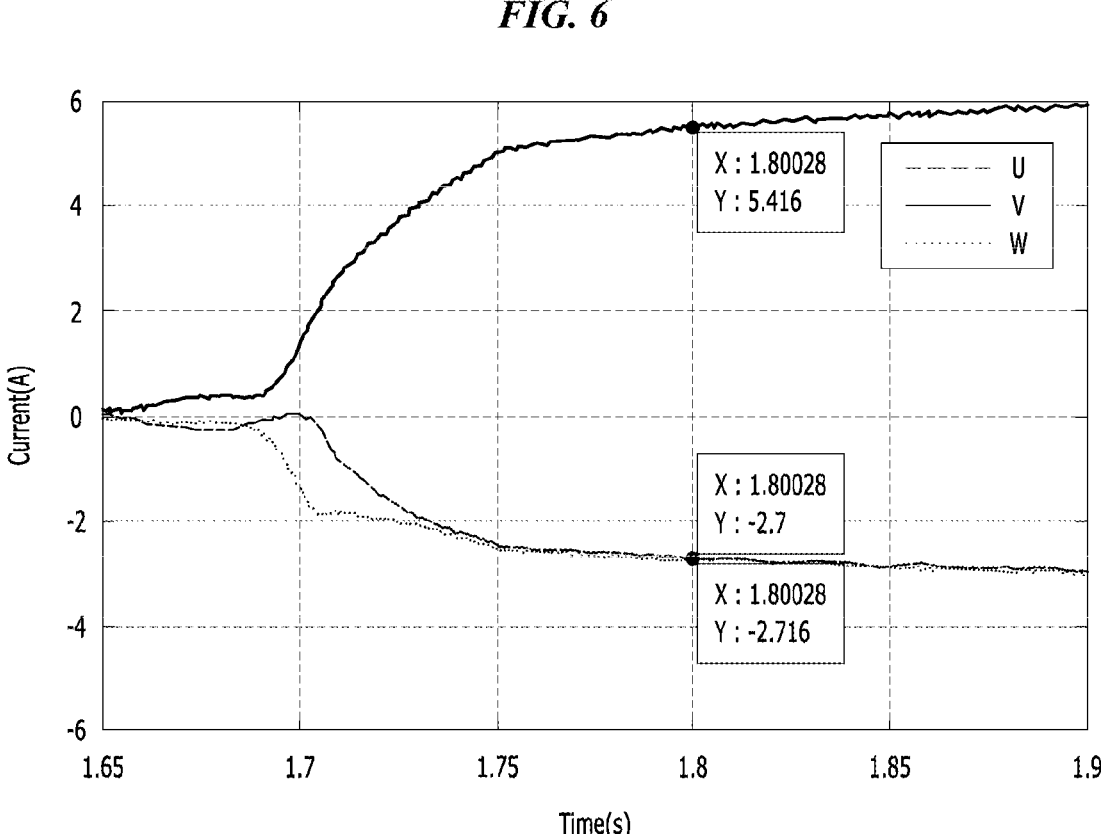
FIG. 6 is a view illustrating a monitoring result graph of a phase current during fixed driving of a V-phase, among three phases of a motor according to an exemplary embodiment.

FIG. 6 is a view illustrating a monitoring result graph of a phase current during fixed driving of a V-phase, among three phases of a motor according to an exemplary embodiment.

Referring to FIG. 6, it was understood that the sum of currents (y values) of phases was 0 [A] at the same time and when a V-phase of three phases was fixedly driven, it was confirmed that the U-phase and W-phase currents were measured to be the same as a 50% of an absolute value of that of the V-phase.

For this research, in order to compare current errors of the motor under the normal condition environment and the harsh condition environment, an initial diagnosis criterion of the phase current was selected as represented in Table 2 to conduct the experiment.

TABLE 2

| U-phase current | V-phase current | W-phase current |
|---|---|---|
| 0.5 times V (+/−5%) | Fixedly driven | 0.5 times V (+/−5%) |

In the meantime, when any one phase of the motor is fixedly driven, a switching element FET of the motor driving circuit is not fully turned on, but is repeatedly switched according to the PWM signal, so that ripples may occur in real time. Accordingly, current values of the U-phase, the V-phase, and the W-phase were compared based on the same time.

Further, during the experiment for this research, a dual-die type motor position sensor having a redundancy characteristic was applied.

Figure 7:
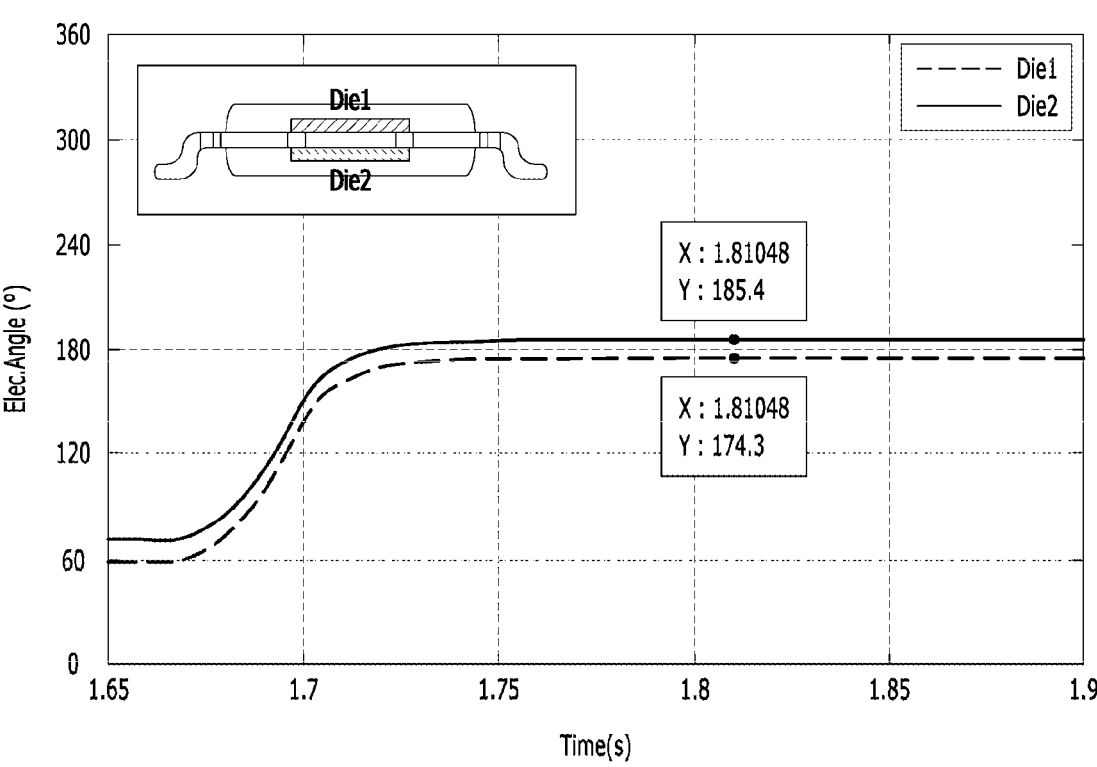
FIG. 7 is a graph illustrating an electric angle obtained by two signals of a dual-die type motor position sensor which are output during a V-phase fixed driving time according to an exemplary embodiment of FIG. 6.

FIG. 7 is a graph illustrating an electric angle obtained by two signals of a dual-die type motor position sensor which are output during a V-phase fixed driving time according to an exemplary embodiment of FIG. 6.

The alignment between the rotor of the motor and the motor position sensor does not ideally match so that there may be an error between an electric angle obtained by means of any one semiconductor chip Die1 of the motor position sensor of FIG. 7 and an electric angle obtained by means of the other semiconductor chip Die2. Therefore, there may be an error between two electric angles obtained by different signals of the motor position sensor. Due to this assembly tolerance, an electric angle which was actually acquired was stored as a reference value in the memory (for example, EEPROM) and then the experiment was conducted with the reference value as an inspection reference.

In the experiment for this research, the electric angle of FIG. 7 measured at the room temperature was set as a reference to be compared with an electric angle output under the harsh condition and a tolerance range reference was set to be +/−10 degrees.

Here, the harsh condition may be a condition in which the state of the motor becomes a failure state due to the environmental condition after actually installing a motor and a motor position sensor in the vehicle.

In the experiment, it was assumed that the ambient temperature and voltage fluctuations complexly occur along with the tilt occurring between the motor and the motor position sensor due to long-term use of the brake system.

Figure 8:
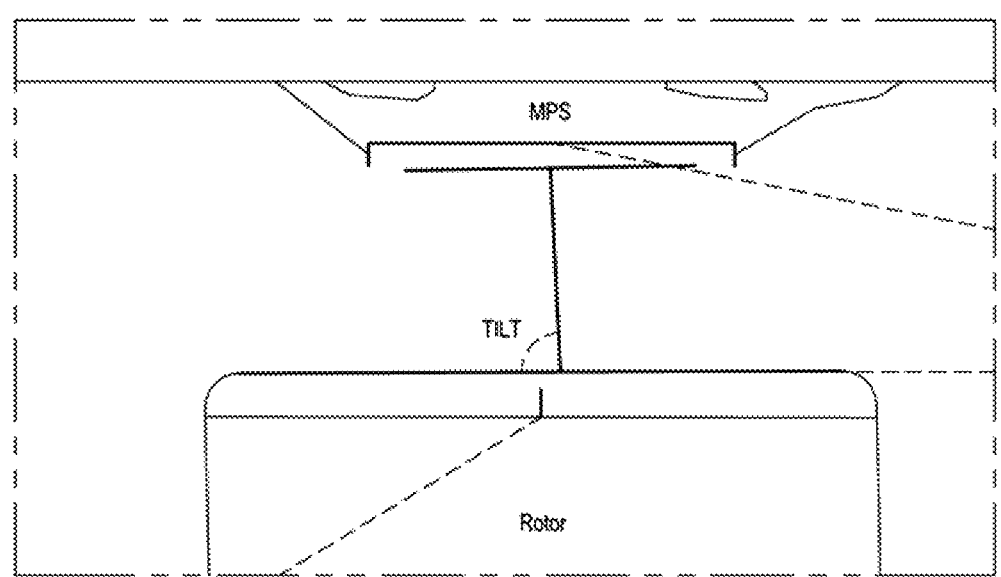
FIG. 8 is a view illustrating a cross-section of an assembled part to cause the tilt between a motor and a motor position sensor according to an exemplary embodiment.

First, an assembling state of the motor, that is, the rotor of the motor and the motor position sensor (MPS) was adjusted as illustrated in FIG. 8, to allow the electric angle to reach the allowable error range even at the room temperature by assuming that the tilt occurs between the rotor of the motor and the motor position sensor due to the vibration.

FIG. 8 is a view illustrating a cross-section of an assembled part to cause the tilt between a motor and a motor position sensor (MPS) according to an exemplary embodiment.

Between two dies of the motor position sensor, any one semiconductor chip Die2 is farther from the rotor of the motor than the other semiconductor chip Die1 so that the error may be larger.

An electric angle obtained when a V-phase of three phases of the motor is fixedly driven in an assembled state in which the tilt occurs as illustrated in FIG. 8 is shown as in Table 3 below.

TABLE 3

| Electric angle | Before TILT | After TILT | Error |
|---|---|---|---|
| Die 1 | 174 degrees | 182 degrees | 8 degrees |
| Die 2 | 185 degrees | 195 degrees | 10 degrees |

Under the above-described state, when the motor was driven for initial diagnosis of the motor based on the room temperature, it was understood that the motor was in a normal state. Therefore, in order to diagnose the state of the motor according to the ambient environment as a failure state, the experiment was conducted by setting the ambient temperature from the minimum of −40 degrees to the maximum of 125 degrees. Further, the voltage was adjusted to 16 V and 9 V to measure a phase current and an electric angle according to each condition.

As a verification result for every condition as described above, it was confirmed that under the high temperature and high voltage condition, maximum errors occurred in both the phase current and the electric angle.

As described above, when the V-phase is fixedly driven, three phase currents need to satisfy the condition of 2:1:1 (+/−5%).

Figure 9:
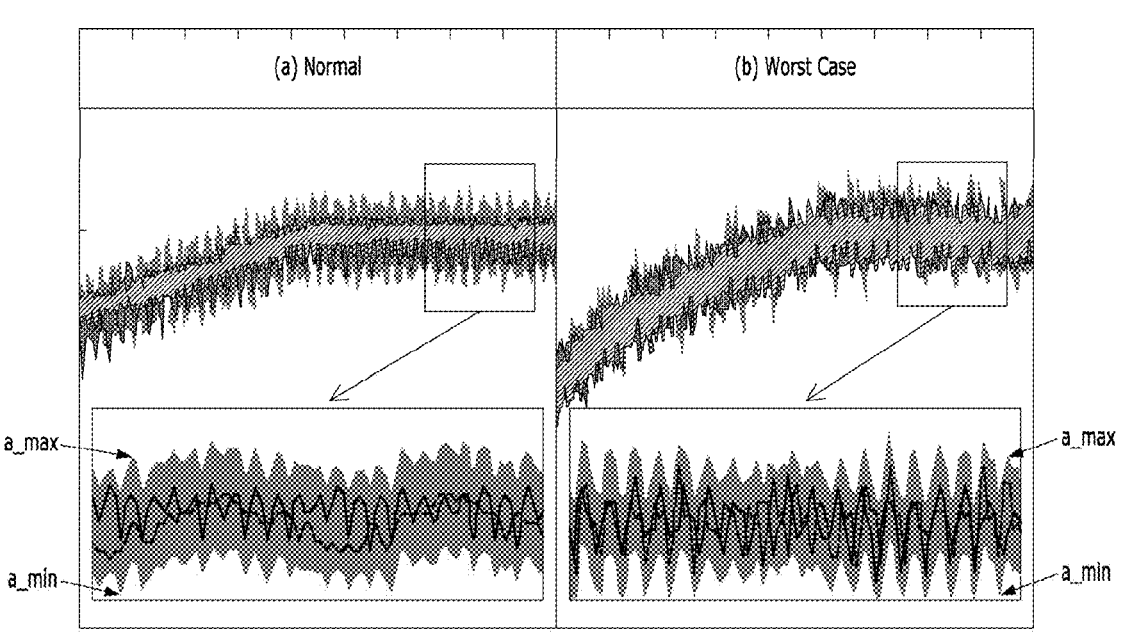
FIG. 9 is a view illustrating a phase current measurement result according to an exemplary embodiment.

FIG. 9 is a view illustrating a phase current measurement result according to an exemplary embodiment.

Referring to FIG. 9, in order to visualize the inspection result of the motor, a range was set by increasing a V-phase current output by an error of 5% and an absolute value was compared with the currents of the U-phase and the W-phase. That is, the currents of the U-phase and W-phase need to be included in the range (a_min to a_max) of the illustrated outermost line.

When the measurement result was checked, in the condition of Worst Case (also called a harsh condition) of FIG. 9B, a current deviation was significantly increased as compared with Normal (or called a normal condition) of FIG.

9A. As a result of the expanded analysis, it was confirmed that the phase current did not exceed the reference range (a_min to a_max), but the margin was significantly reduced.

Figure 10:
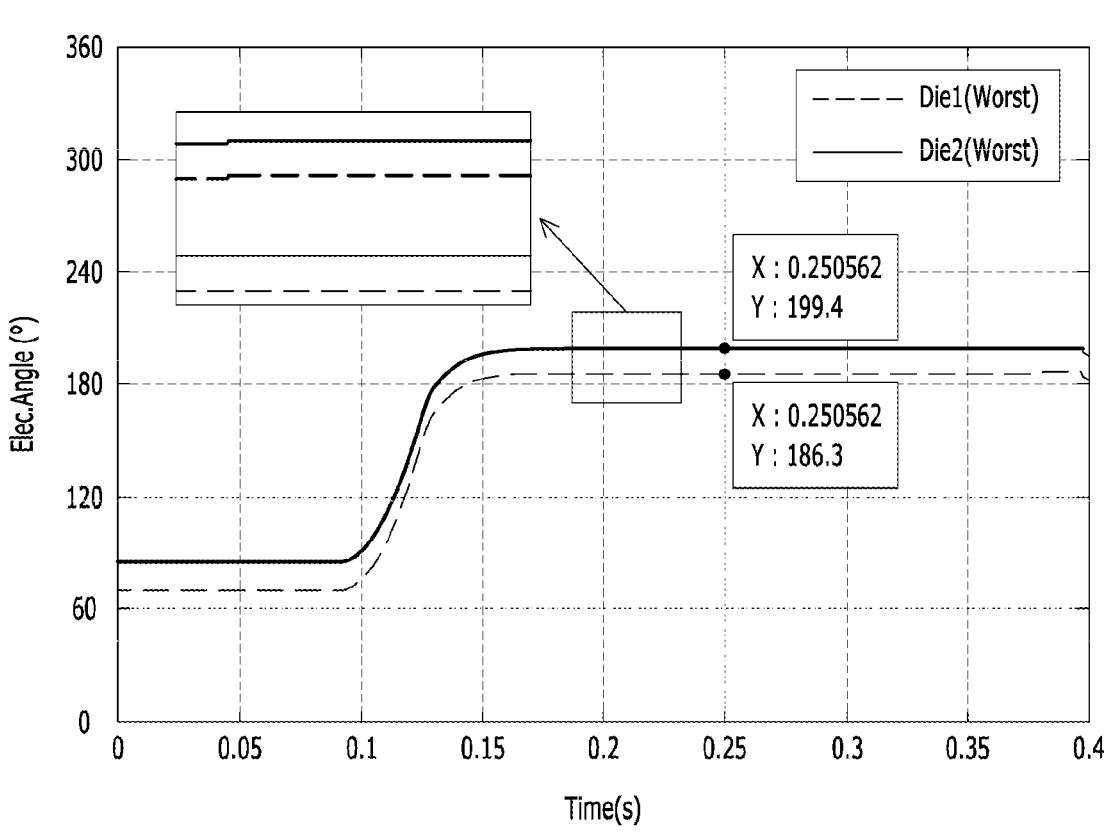
FIG. 10 is a view illustrating an electric angle measurement result according to an exemplary embodiment.

FIG. 10 is a view illustrating an electric angle measurement result according to an exemplary embodiment.

Referring to FIG. 10, it was understood that the electric angles acquired from output signals of two semiconductor chips Die1 and Die2 of the motor position sensor were 186 degrees and 199 degrees, respectively. This indicated that the motor was in a failure state because there was a difference of 10 degrees or larger from the previously set output reference.

Further, referring to FIG. 10, it was understood that even though the output signal of each semiconductor chip of the motor position sensor varied depending on the temperature condition, the shifted variation was the same.

Referring to the enlarged part in FIG. 10, when it was compared with a simple tilt occurrence condition at the room temperature, it was understood that two output signals were changed in the same way.

According to this result, when the experiment was conducted under the harsh condition, as compared with the normal condition, a margin of the phase current was reduced from the reference due to the increased noise. Further, electric angles acquired according to the outputs of all the semiconductor chips of the motor position sensor were increased or decreased with the same delta value.

Based on these results, the following compensation method was derived to reduce an error of the electric angle of the motor position sensor by the compensation even though the motor was diagnosed to be in a failure state.

In order to compensate an electric angle under the high temperature condition, ambient temperature information of the motor was necessary to distinguish an actual failure. However, the temperature was not directly measured at the ECU level of the brake system so that in this research, a method of indirectly determining the ambient temperature by monitoring characteristic change according to the temperature and voltage changes of the switching element of the motor driving circuit, rather than direct temperature measurement, to compensate was considered.

Elements which affect a switching noise level of the switching element of the motor driving circuit include a parasitic capacitance and a body diode. The temperature does not change the characteristic of the parasitic capacitance, but affects a forward voltage of the body diode. That is, during the switching operation of the switching element of the motor driving circuit, a noise level fluctuates due to the increase or decrease of a transient recovery voltage (TRV).

Accordingly, as described above, when any one phase of three phases of the motor is controlled to be fixedly driven, after storing current information in the memory (EEPROM), the electric angle acquired by the output signal of the motor position sensor was compensated by estimating the temperature change according to the current fluctuation value during the initial diagnosis.

Figure 11:
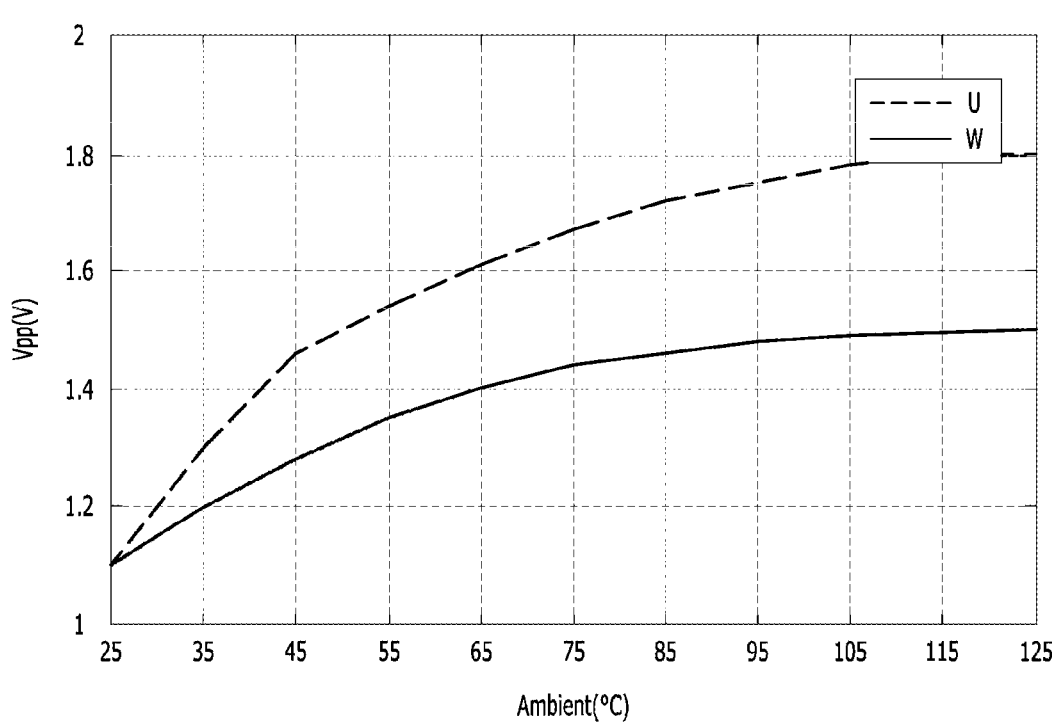
FIG. 11 is a graph of a voltage corresponding to a current noise of each phase for every ambient temperature according to an exemplary embodiment.

FIG. 11 is a graph of a voltage corresponding to a current noise of each phase for every ambient temperature according to an exemplary embodiment.

Referring to FIG. 11, it is understood that when the V-phase of three phases of the motor is controlled to be fixedly driven, differences of peak values of currents of the U-phase and the W-phase increase in the form of a natural logarithmic function. As for reference, each phase current is identified by amplifying a voltage across the shunt resistor so that the current is output in the form of a voltage.

Accordingly, the graph as illustrated in FIG. 11 was generated by calculating a difference Vpp of a maximum voltage value Vmax and a minimum voltage value Vmin while controlling the V-phase to be fixedly driven.

Accordingly, the ambient temperature may be estimated based on the difference of a maximum current value and a minimum current value or the difference of a maximum voltage value and a minimum voltage value.

Figure 12:
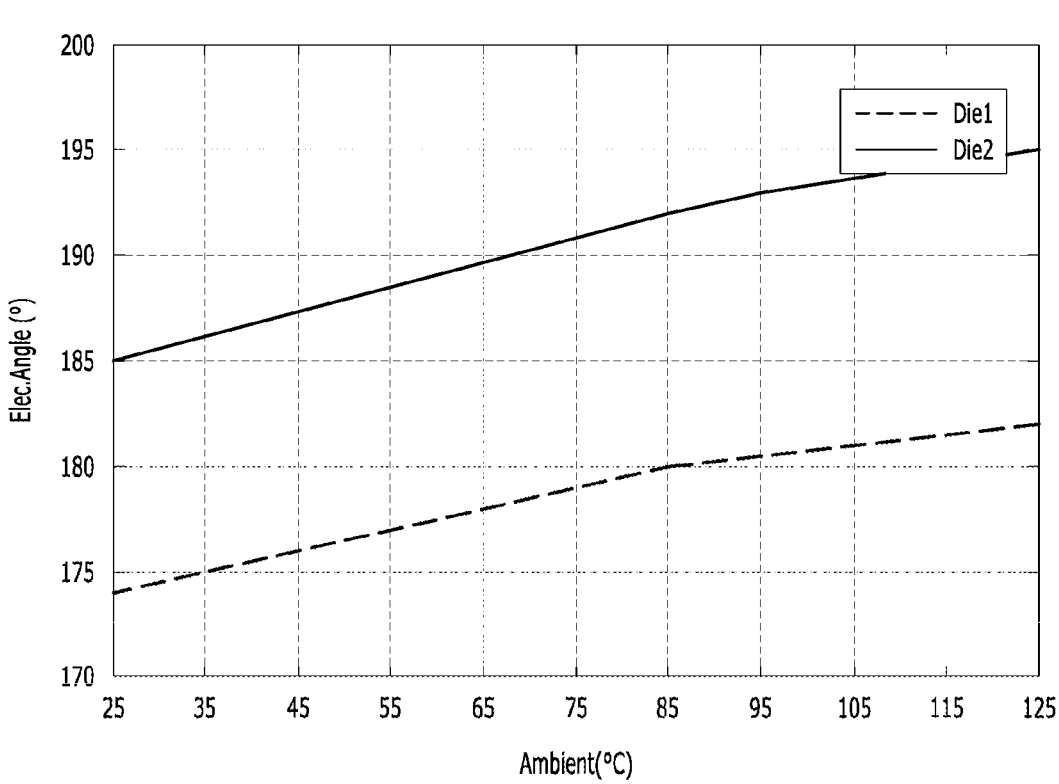
FIG. 12 is a graph illustrating an electric angle of a motor acquired at every ambient temperature according to an exemplary embodiment.

FIG. 12 is a graph illustrating an electric angle Elec_Angle of a motor acquired at every ambient temperature according to an exemplary embodiment.

Referring to FIG. 12, it is understood that unlike the current of each phase of the motor, the electric angle according to the temperature has a linear characteristic. Even though the electric angle according to the temperature and the current characteristic of each phase are different, the characteristic that the error increases is the same. Accordingly, even though it was determined that the motor was in a failure state under the harsh condition, when the electric angle according to the temperature and the current (and/or voltage) data of each phase were compared according to the correlation, a result that the error of the electric angle of the motor was reduced by compensating for an electric angle of the motor according to the temperature was derived.

According to the exemplary embodiments of the present disclosure, the above-described research proposes a compensation technology of improving a problem that the motor is determined to be a failure state due to the external environment corresponding to the harsh condition during the motor state diagnosis (for example, an initial state diagnosis).

In the case of the electronic components to which the three-phase motor is applied, tilt may occur between the motor and the motor position sensor due to vibration for a long time after being applied to the actual vehicle. Specifically, there is a high probability of being deviated from a predetermined reference during the initial state diagnosis of the motor under the harsh condition such as a high temperature.

According to the result of measuring a current noise of each phase of the motor and the electric angle of the motor at every temperature in the above-described research, it was confirmed that the error of each data was increased in accordance with the increase of the temperature.

Accordingly, in the above-described exemplary embodiment, it was proposed to ensure the margin for the diagnosis reference by applying an electric angle corresponding to the temperature as a compensated electric angle in the actual verification by the comparison according to the correlation of result data of measuring a current noise of each phase of the motor and the electric angle of the motor at every temperature.

Accordingly, the motor state diagnosis according to the above-described exemplary embodiment may relieve the probability of failure of the motor as compared with the related art and when this technology is applied to a chassis part, the reliability may be further improved.

In other words, the brake system according to the above-described exemplary embodiment and the method for compensating for a position data error of a motor thereof may reduce a situation that the motor is determined to be in a failure state by compensating for position data (for example, an electric angle) acquired by the motor position sensor and further improve the reliability of the brake system, as compared with the related art.

Further, the brake system according to the above-described exemplary embodiment and the method for compensating for a position data error of a motor thereof may be implemented as hardware of the brake system of the related art by simply adding a software logic so that no additional cost is necessary.

Meanwhile, the disclosed embodiments may be implemented in the form of a recording medium that stores instructions executable by a computer. The instructions may be stored in the form of program codes, and when executed by a processor, the instructions may perform operations of the disclosed embodiments by generating a program module. The recording medium may be implemented as a computer-readable recording medium.

The computer-readable recording medium may include all kinds of recording media storing instructions that can be interpreted by a computer. For example, the computer-readable recording medium may be Read Only Memory (ROM), Random Access Memory (RAM), a magnetic tape, a magnetic disc, flash memory, an optical data storage device, etc.

A machine-readable storage medium may be provided in the form of a non-transitory storage medium, wherein the term 'non-transitory' simply means that the storage medium is a tangible device, and does not include a signal (e.g., an electromagnetic wave), but this term does not differentiate between where data is semi-permanently stored in the storage medium and where the data is temporarily stored in the storage medium.

So far, the disclosed embodiments have been described with reference to the accompanying drawings. It will be understood by one of ordinary skill in the technical art to which the disclosure belongs that the disclosure can be embodied in different forms from the disclosed embodiments without changing the technical spirit and essential features of the disclosure. Thus, it should be understood that the disclosed embodiments described above are merely for illustrative purposes and not for limitation purposes in all aspects.

The invention claimed is:

1. A brake system, comprising:
a motor configured to drive an electro mechanical brake;
a motor position sensor configured to generate and output a rotor position signal of the motor; and
a controller electrically connected to the motor and the motor position sensor,
wherein the controller is configured to monitor a current or a voltage of at least one phase of three phases of the motor while controlling the motor to fixedly drive any one phase of three phases of the motor, determine an ambient temperature of the motor by identifying a maximum current and a minimum current of the at least one phase or identifying a maximum voltage and a minimum voltage of the at least one phase, and compensate for an electric angle of the motor acquired by an output signal of the motor position sensor based on the determined ambient temperature.

2. The brake system according to claim 1, wherein the at least one phase includes at least one, among phases other than a fixedly driven phase, among three phases of the motor.

3. The brake system according to claim 2, wherein the controller is configured to determine the ambient temperature of the motor further based on a reference current value at every temperature which is previously stored for each phase of the motor, and the reference current value at every temperature which is previously stored includes a reference maximum current and a reference minimum current at every temperature which are previously stored for each phase of the motor or a difference of the reference maximum current and the reference minimum current at every temperature which are previously stored for each phase of the motor.

4. The brake system according to claim 3, wherein the controller is configured to determine a temperature of a reference current value matching the maximum current and the minimum current of the at least one phase, in the reference current value at every temperature which is previously stored, as an ambient temperature of the motor.

5. The brake system according to claim 2, wherein the controller is configured to determine the ambient temperature of the motor further based on a reference voltage value at every temperature which is previously stored for each phase of the motor, and the reference voltage value at every temperature which is previously stored includes a reference maximum voltage and a reference minimum voltage at every temperature which are previously stored for each phase of the motor or a difference of the reference maximum voltage and the reference minimum voltage at every temperature which are previously stored for each phase of the motor.

6. The brake system according to claim 5, wherein the controller is configured to determine a temperature of a reference voltage value matching the maximum voltage and the minimum voltage of the at least one phase, in the reference voltage value at every temperature which is previously stored, as an ambient temperature of the motor.

7. The brake system according to claim 2, wherein the controller is configured to compensate for the electric angle of the motor, further based on a compensated electric angle at every temperature which is previously stored.

8. The brake system according to claim 1, wherein the controller is configured to determine whether the motor is in a failure state or a normal state based on the electric angle of the motor and a previously stored reference electric angle.

9. The brake system according to claim 8, wherein the controller is configured to, when the motor is in a failure state, compensate for the electric angle of the motor.

10. The brake system according to claim 1, wherein the controller is configured to control the motor by fixedly driving any one phase by applying a power for initial diagnosis of the motor.

11. A position data error compensating method of a motor of a brake system, comprising:
monitoring a current or a voltage of at least one phase of three phases of a motor which drives an electro mechanical brake while controlling the motor to fixedly drive any one phase of three phases of the motor;
determining an ambient temperature of the motor by identifying a maximum current and a minimum current of the at least one phase or identifying a maximum voltage and a minimum voltage of the at least one phase, according to the monitoring of the current or the voltage of the at least one phase; and
compensating for an electric angle of the motor acquired by an output signal of the motor position sensor based on the determined ambient temperature.

12. The position data error compensating method according to claim 11, wherein at least one phase includes at least one, among phases other than the fixedly driven phase, among three phases of the motor.

13. The position data error compensating method according to claim 12, wherein the determining of the ambient temperature of the motor is further based on a reference current value at every temperature which is previously stored for each phase of the motor and the reference current value at every temperature which is previously stored includes a reference maximum current and a reference minimum current at every temperature which are previously stored for each phase of the motor or a difference of the reference maximum current and the reference minimum current at every temperature which are previously stored for each phase of the motor.

14. The position data error compensating method according to claim 13, wherein the determining of the ambient temperature of the motor includes:

determining a temperature of a reference current value matching the maximum current and the minimum current of the at least one phase, in the reference current value at every temperature which is previously stored, as the ambient temperature of the motor.

15. The position data error compensating method according to claim 12, wherein the determining of the ambient temperature of the motor is further based on a reference voltage value at every temperature which is previously stored for each phase of the motor, and the reference voltage value at every temperature which is previously stored includes a reference maximum voltage and a reference minimum voltage at every temperature which are previously stored for each phase of the motor or a difference of the reference maximum voltage and the reference minimum voltage at every temperature which are previously stored for each phase of the motor.

16. The position data error compensating method according to claim 15, wherein the determining of the ambient temperature of the motor includes:

determining a temperature of a reference voltage value matching the maximum voltage and the minimum voltage of the at least one phase, in the reference voltage value at every temperature which is previously stored, as the ambient temperature of the motor.

17. The position data error compensating method according to claim 12, wherein the compensating of the electric angle of the motor is further based on a compensated electric angle at every temperature which is previously stored.

18. The position data error compensating method according to claim 11, wherein the compensating of the electric angle includes:

determining whether the motor is in a failure state or a normal state based on the electric angle of the motor and a previously stored reference electric angle.

19. The position data error compensating method according to claim 18, wherein the compensating of the electric angle includes:

compensating for the electric angle of the motor when the motor is in the failure state.

20. The position data error compensating method according to claim 11, wherein the controlling of the motor to fixedly drive any one phase is based on the power application for initial diagnosis of the motor.

\* \* \* \* \*